United States Patent [19]

Hopkins, II et al.

[11] Patent Number: 4,784,487

[45] Date of Patent: Nov. 15, 1988

[54] FLAT BAND OPTICAL RELAY USING APERTURES AND SIMPLE LENSES

[75] Inventors: George W. Hopkins, II, Sunnyvale; Barry G. Willis, Los Altos Hills, both of Calif.

[73] Assignee: Hewlett-Packard Company, Palo Alto, Calif.

[21] Appl. No.: 207,037

[22] Filed: Jun. 14, 1988

Related U.S. Application Data

[63] Continuation of Ser. No. 837,458, Mar. 7, 1986, abandoned.

[51] Int. Cl.[4] .............................. G01J 3/28; G01J 3/10
[52] U.S. Cl. .................................... 356/326; 356/331
[58] Field of Search ............... 356/308, 326, 331, 332, 356/334

[56] References Cited

U.S. PATENT DOCUMENTS 2,630,736  3/1953  Beitz ..................................... 356/308
3,547,542  12/1970  Bulpitt et al. ........................ 356/308
3,886,331  5/1975  Schierer, Jr. ..................... 356/308 X

OTHER PUBLICATIONS

Kingslake, "Lens Design Fundamentals" Academic Press (1978) pp. 89-92.
Gilbert, Jr., "Optimizing Monochromator Performance" Electro-Opt. Syst. Des. (U.S.A.) vol. 7, #2, Feb. 1975, pp. 25-31.

*Primary Examiner*—Vincent P. McGraw
*Attorney, Agent, or Firm*—John A. Frazzini

[57] ABSTRACT

An optical relay having a pair of simple lenses and an opaque barrier defining an aperture. In a spectrometer, the optical relay is positioned between a light source and an opaque barrier defining a slit to focus light of a reference wavelength $w_r$ onto the slit. The location of the aperture and the choice of $w_r$ are selected so that the flux of light through the slit is substantially flat as a function of wavelength.

11 Claims, 6 Drawing Sheets

FLAT BAND OPTICAL RELAY USING APERTURES AND SIMPLE LENSES

CROSS REFERENCE TO RELATED APPLICATION

This application is a continuation, of application Ser. No. 837,458, filed 3/07/86, now abandoned.

BACKGROUND OF THE INVENTION

The disclosed invention relates in general to an optical relay utilized in a spectroscopic instrument that uses a slit to define an object for a subsequent dispersive element. More particularly, this invention relates to such a relay having a relatively flat power throughput over a selected range of wavelengths. In general, an optical relay is a device that produces an image at one point from a source at another point. Such devices typically utilize lenses and/or mirrors to produce the image.

In a spectrophotometer, light is passed from a light source through a sample cell containing a sample that absorbs some of the light. The light transmitted through the sample cell is directed to a detector for measurement of the spectral intensity distribution of the transmitted light. If the range of wavelengths over which the spectral intensity is measured includes strong absorbance peaks that characterize the sample, then that sample can be identified by the measured spectral distribution. Among the sample substances that are of general interest are: (1) aromatic molecules that absorb at 230–300 nanometers; (2) amino acids, sugars and hydrocarbons that absorb strongly near 190 nanometers; (3) iron, copper, urea and hemoglobin that absorb near 820 nanometers; and (4) enzyme cofactors such as AND that absorb near 400 nanometers. Therefore, a general purpose spectrophotometer should measure the absorption spectrum of a sample over a range from about 190 nanometers to about 820 nanometers.

Unfortunately, over the wide range of wavelengths from 190 to 820 nanometers, simple lenses exhibit a significant amount of chromatic aberration. If the wavelength range only extended over the visible light range, then the fractional change in the focal length f of a simple lens would be on the order of 0.016. However, over the range from 190 to 820 nanometers, the fractional change in f is on the order of 0.2. Therefore, over such a range it is common to use either achromatic lenses which have typical fractional changes in f on the order of 0.0004 (over the visible range) or to use focussing mirrors. However, both achromatic lenses and focussing mirrors are significantly more expensive than simple lenses Simple lenses have been used in filter photometers because such photometers utilize a wide area detector that is insensitive to the chromatic aberrations of simple lenses. In such an instrument, the wavelength is selected by placing a suitable filter in the path of the optical beam. Such instruments have the advantage of low cost, but are unable to scan an entire spectrum.

In order to scan an entire spectrum in an instrument with a dispersive element such as a diffraction grating or prism, a slit is required to define the area of the beam to be detected. In one type of spectrometer, the beam passes successively through the dispersive element, the slit and then the sample cell. In such a spectrometer, only the portion of the spectrum that is incident on the slit passes through the slit to the sample cell. The width of the slit determines how wide a portion of the spectrum passes through the sample cell so that the slit width determines the resolution of the spectrometer. The spectrum can be scanned by rotating the dispersive element to sweep the spectrum across the slit. In another type of spectrometer, the beam is passed successively through the sample cell and a slit before being incident on a dispersive element such as a diffraction grating. A photodiode array is used to detect the entire spectrum in parallel, thereby increasing the speed of operation. The width of the slit again determines the resolution of the spectrometer.

When a simple lens is utilized in either of these two types of systems over a wide wavelength range, the spectral distribution of light transmitted by the slit exhibits a peak at the wavelength focussed onto the slit. The reason for such a peak can be seen as follows. Because of chromatic aberration, the light at wavelengths other than at the distribution peak are out of focus at the slit. This results in a beam width at the slit that is wider for the out of focus wavelengths than for the wavelength focussed onto the slit. The slit width is typically selected to be on the order of the beam width of the focussed light in order to maximize resolution. As a result of this, part of each of the out of focus wavelengths is blocked by the edges of the slit, thereby decreasing the amount of light reaching the detector at these wavelengths.

For a light source having a relatively flat spectrum over the wavelength range from 190 nanometers to 800 nanometers, the spectral distribution of the light passing through the slit has the shape shown in FIG. 1. When a broad range of wavelengths is used, such as from 190 nanometers to 820 nanometers, this peaking is particularly severe. If the slit width is increased to reduce this peaking, then the resolution is decreased.

Therefore, wide band spectrometers typically utilize achromatic lenses or mirrors to focus the optical beam. These mirrors are typically manufactured by single-point machining or electroforming. Because these mirrors typically have the shape of a conical section generated by rotating a conic about its axis, they are relatively expensive to produce. In an optical relay utilizing mirrors, the mirrors are tilted at a small angle relative to the light incident on each of such mirrors so that the reflected light is not collinear with the incident light. This is done to avoid blocking part of the beam by the mirrors themselves. Such deviation of the beam path requires complex mounting surfaces produced by additional machining operations to ensure that the mirrors are rigidly and accurately positioned to accurately direct and focus the beam. Also, the mirror surface is often coated with a thin film for protection. This film adds cost and can degrade with time, thereby degrading performance. All of this complexity results in a cost that is significantly greater than for an optical relay utilizing a simple lens.

The complicated mounting and machining operations can be avoided by utilizing achromatic lenses (also called achromats) in an in-line optical design which can be quite compact. Unfortunately, if an achromatic lens is corrected for the ultraviolet portion of the spectrum extending down to 190 nanometers, then such lenses are very expensive. Because most elements are opaque to ultraviolet light, such lenses are typically made of silica and calcium fluoride and the individual elements of the achromat have powers that are much larger than the net power of the achromat. This is the reason for the high cost. The high powers of the achromat components also introduce residual monochromatic aberrations that limit use to relatively small numerical aperture or small dimensions. Achromats perform well, but are typically twice as expensive as an equivalent mirror. They are generally used where compactness is required.

The variation in index of refraction n over the range of the spectrometer produces a variation in the focal length of a lens over this range. A measure of this variation is the normalized longitudinal chromatic aberration defined to be $df/f_R$ where df is the total variation in f over the wavelength range of interest and $f_R$ is the focal length of a reference wavelength, typically selected within the range of interest. For an achromatic lens, the normalized longitudinal chromatic aberration is on the order of 0.0004. For a simple lens, the normalized longitudinal chromatic aberration is on the order of 0.016 over the range of visible light, but is on the order of 0.2 over the range from 190 nanometers to 820 nanometers. In order to reduce the expense of optical relays, it would be advantageous to have a relay design that only utilizes simple lenses, but produces a relatively flat spectral transmission over the full range from 190 nanometers to 820 nanometers.

SUMMARY OF THE INVENTION

In the following discussion, the first digit of a reference numeral in a figure will indicate the first figure in which the element designated by that reference numeral is illustrated.

In accordance with the illustrated preferred embodiment, an optical relay is presented that is suitable for use in a low cost spectrometer operating over a wavelength range over which the chromatic aberration of a simple lens is significant. This optical relay utilizes a pair of simple lenses to image light from a source, through a sample cell and onto a slit. A dispersive element, such as a holographic grating, disperses the light that passes through the slit to a detector such as a photodiode array. An achromat is theoretically impossible using two separated simple lenses with positive powers (See, for example, Rudolph Kingslake, *Lens Design Fundamentals*, Academic Press (1978), pp. 89-92). However, in accordance with the preferred optical relay presented herein, the locations of the lenses, the location and diameter of an aperture, the focal lengths of the lenses, and the size and location of the slit are selected so that the spectral intensity of light through the slit is substantially constant over the range of optical wavelengths of interest. The preferred embodiment is discussed for a range from 190 nanometers to 820 nanometers, but this particular choice should not be construed as limiting the scope of the invention.

The holographic grating focusses the light coming through the slit onto the photodiode array. Therefore, the light passing through the slit serves as the object for the grating. Because of the chromatic aberration of the lenses, the image distance of the optical relay is different for different wavelengths. Likewise, the diameter of the light beam at the slit will be different for different wavelengths. If the slit were larger than the beam, then at any given wavelength the size of the image formed on the grating would be determined by the beam diameter. Because the beam diameter varies with wavelength, this would produce on the photodiode array an image that varies in size as a function of wavelength. This would produce a resolution that varies with wavelength. Therefore, to avoid this variation of resolution with wavelength, the slit is selected to be smaller than the beam at all wavelengths measured by the detector.

Because resolution increases with decreasing slit size, it is advantageous to keep the slit small. In order to keep the spectrometer signal to noise ratio as large as possible, substantially all of the light from the spectrometer's light source should be transmitted through the slit. Therefore, the net magnification of the optical relay is selected so that the optical relay produces on the slit an image of the light source that just fills the entire slit. Extended sources are commonly used in spectrophotometers in order to fill the slit uniformly with light. This enables the full area of each diode in the photodiode array to be used to detect incident light.

In a spectrometer designed to use extremely small sample quantities, it is advantageous to image the optical beam onto the small sample cell. In such a system, the sample cell is located between the two simple lenses and the distances are chosen so that the beam is imaged onto the sample cell.

In a general purpose spectrometer, it is desirable to be able to utilize various size sample cells. If the light incident on the sample cell is not collimated, then a change in the length of the sample cell will alter the image distance for the optical relay. Therefore, it is desirable for the light at the sample cell to be collimated. This is achieved by placing the sample cell between the two simple lenses and locating the first of the lenses at a distance from the light source equal to the focal length of the first lens. Because of the chromatic aberration of the first lens, only one wavelength of light can be made collimated in the region between the lenses. This wavelength is chosen so that the light at 190 nanometers is converging as strongly as the light at 820 nanometers is diverging. Quantitatively, this is achieved by requiring that the image distance from the first lens for the light at 190 nanometers is equal to minus the image distance from the first lens for the light at 820 nanometers. A simple calculation using the lens equation shows that this requires that the light be collimated for the reference wavelength at which the index of refraction (denoted by $n_r$) is equal to the average of the indices of refraction at 190 and 820 nanometers. When light at this reference wavelength is collimated, the beam will be referred to herein as being "collimated" even though light at wavelengths other than the reference wavelength are not collimated. For the particular lens utilized in the preferred embodiment, the reference wavelength is 250 nanometers.

A first aperture, that serves as a stop for the light passing through the first lens, is located between the first lens and the slit. Because the lenses bend the shorter wavelength rays of light more strongly than the longer wavelength rays, a larger cone of rays emanating from the source will be bent through the first aperture for shorter wavelengths than for longer wavelengths. Equivalently, this means that the first lens/first aperture combination has a larger acceptance angle for the wavelengths near 190 nanometers than for those near 820 nanometers. This has the effect of increasing at the detector the spectral intensity distribution at the shorter wavelengths relative to the intensity distribution at longer wavelengths.

As discussed above, the spectral intensity distribution typically peaks at the wavelength that is in focus on the slit. By choosing this wavelength in conjunction with the location of the first aperture, the spectral intensity distribution can be made substantially flat. Because the location of the aperture can be chosen to enhance the amplitude of the short wavelength end of the selected wavelength range, the choice of wavelength in focus on the slit is selected to enhance the long wavelength end. This is achieved by selecting this wavelength closer to the long wavelength end of the range than to the short wavelength end. Further flattening of the distribution can be achieved by including one or more additional apertures. Because the simple lenses and apertures utilized in this relay are substantially less expensive than focussing mirrors and acromatic lenses, this relay will provide a substantial cost savings while preserving a substantially flat spectral intensity distribution across the range of wavelengths of interest.

DESCRIPTION OF THE PREFERRED EMBODIMENT

Figure 1:
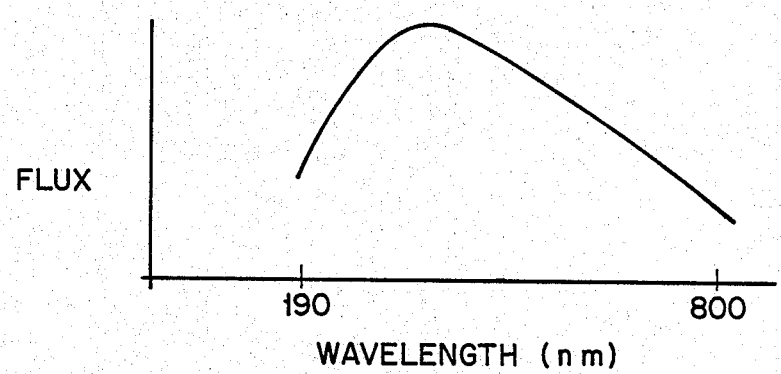
FIG. 1 illustrates the effect on spectral distribution of light on a spectrometer detector due to partial blockage at a slit of out of focus wavelengths of light.
Figure 2:
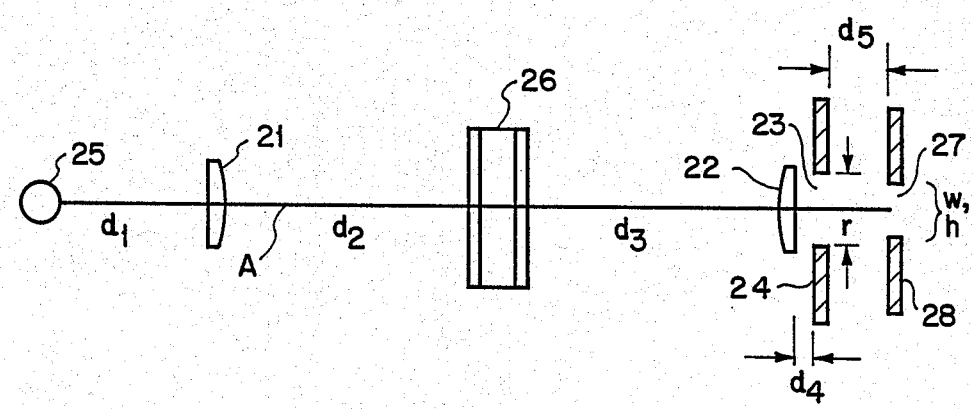
FIG. 2 illustrates the optical relay using a pair of simple lenses and constructed in accordance with the disclosed invention to provide a substantially flat spectrum at the detector.

FIG. 2 illustrates an optical relay utilizing a first simple lens 21, a second simple lens 22 and an aperture 23 in an opaque barrier 24. This relay transmits light from a source 25, through a sample cell 26 and onto a slit 27 formed in an opaque barrier 28. Slit 27 is rectangular with a width w and a height h. Aperture 23 is circular with a radius r. The distance from source 25 to lens 21 is $d_1$, the distance from lens 21 to sample cell 26 is $d_2$, the distance from sample cell 26 to lens 22 is $d_3$, the distance from lens 22 to aperture 23 is $d_4$ and the distance from aperture 23 to slit 28 is $d_5$. By a proper choice of these parameters, this optical relay can be made to have a substantially flat spectrum (shown in FIG. 3) over the range of wavelengths of interest, even though the optical relay utilizes a pair of simple lenses having significant chromatic aberration.

There are two primary embodiments of the optical relay. In the first embodiment, the distances $d_1$ and $d_2$ are selected so that the light from source 25 is focussed onto sample cell 26. This embodiment is particularly suitable for use in spectrometers having extremely small sample cells. By focussing the beam onto the cell, the beam can be concentrated so that all of the beam passes through the small sample cell. The second embodiment is particularly suitable for use in a general purpose spectrometer in which sample cells having a wide range of sizes can be used. In that embodiment, the distance $d_1$ is selected so that lens 21 collimates the light. The position of lens 22 is selected to focus the beam onto slit 27. If the beam is not collimated at the sample cell, then if one sample cell is replaced with another sample cell having a different length along the direction of the optical beam, then the point at which the light is focussed by lens 22 will be moved slightly. As a result of this, the optical response of the spectrometer will be affected by the length of the sample cell. When the light is collimated at the sample cell, then the sensitivity to sample cell length is removed.

Because simple lenses 21 and 22 have chromatic aberration, different wavelengths of light will be bent by different amounts by both lenses. Therefore, strictly speaking, the location of lens 21 cannot be selected to focus all of the light onto the sample cell or to collimate all of the light. Instead, only a single reference wavelength $w_r$ can be focussed onto the cell or can be collimated at the sample cell. This reference wavelength is selected such that the index of refraction $n_r$ of the first lens at $w_r$ is equal to the average of the indices of refraction of light of the first lens for light at the two extrema $w_1$ and $w_2$ of the range of wavelengths of interest.

In the particular embodiment of FIG. 2 presented herein, these extrema are at $w_1 = 190$ nanometers and $w_2 = 800$ nanometers, but the general concept is clearly not limited to this particular choice. For the particular lenses used in the preferred embodiment, this reference wavelength is 250 nanometers. This choice of reference wavelength is made so that when light at the reference wavelength is collimated by the first lens, then the image distance for the light of wavelength $w_1$ is equal to minus the image distance for the light of wavelength $w_2$. As a result of this, in between the two lenses, the light at $w_1$ is converging at an angle equal to the angle at which light at $w_2$ is diverging. When the light at $w_r$ is collimated, the beam will be referred to as being "collimated" even though the other wavelengths are not collimated. Similarly, when the light at $w_r$ is focussed onto the sample cell, then the first lens will be said to "focus" the light beam onto the sample cell even though the light at other wavelengths is not focussed onto the sample cell.

Figure 4:
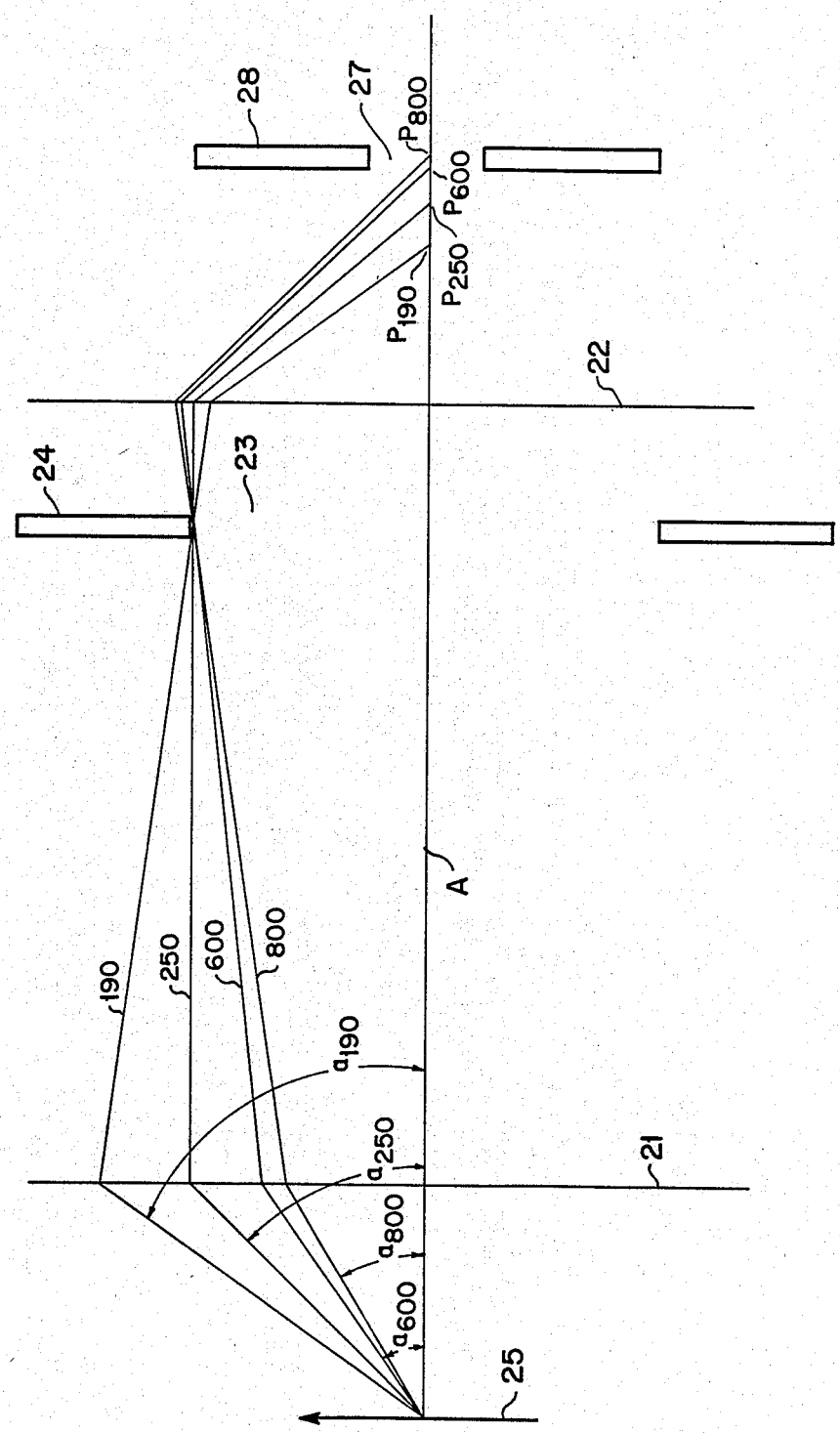
FIG. 4 illustrates the effect of a first aperture on the effective acceptance angle at a first lens as a function of the wavelength of the light.
Figure 5:
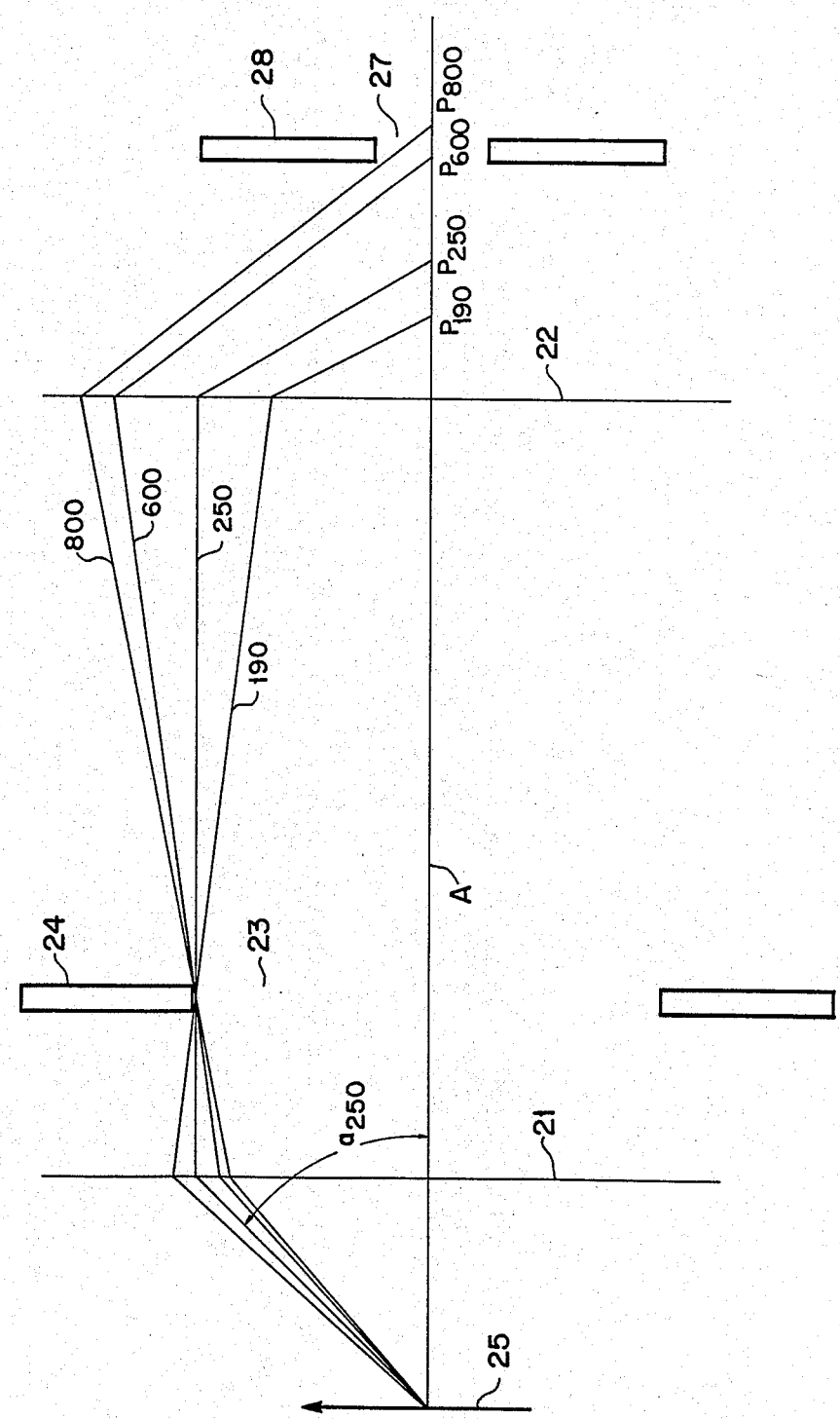
FIG. 5 illustrates how altering the location of the first aperture affects the acceptance angle at the first lens as a function of the wavelength of the light.
Figure 6:
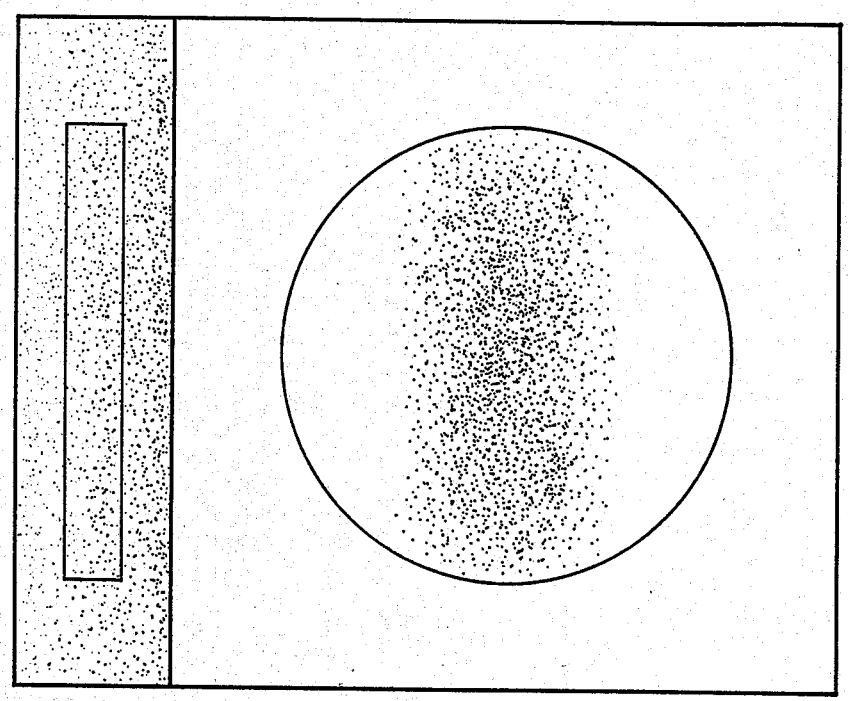
FIGS. 6-9 show the spatial distribution of light incident on the slit and the detector for various choices of wavelength and reference wavelength.
Figure 7:
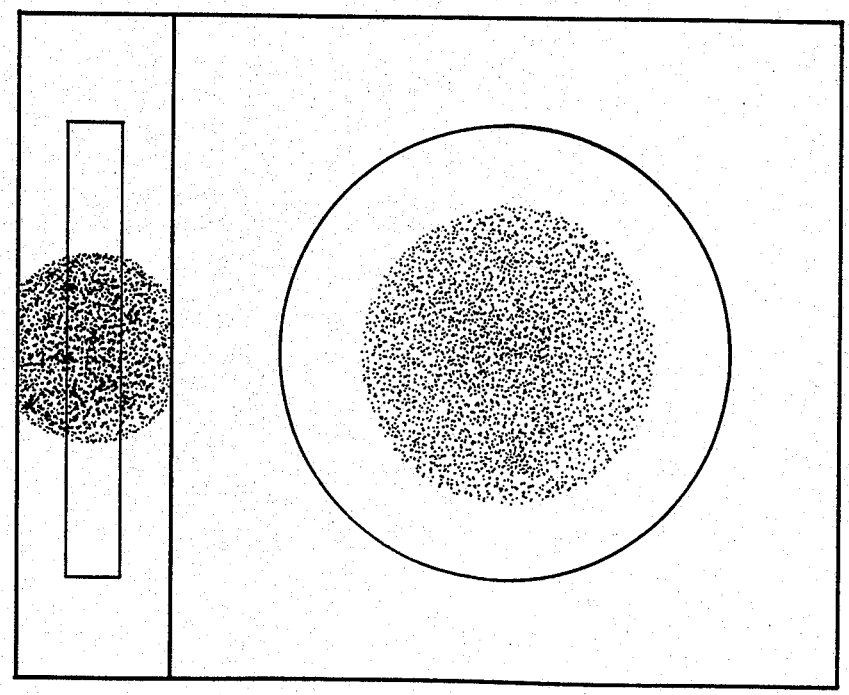
Figure 8:
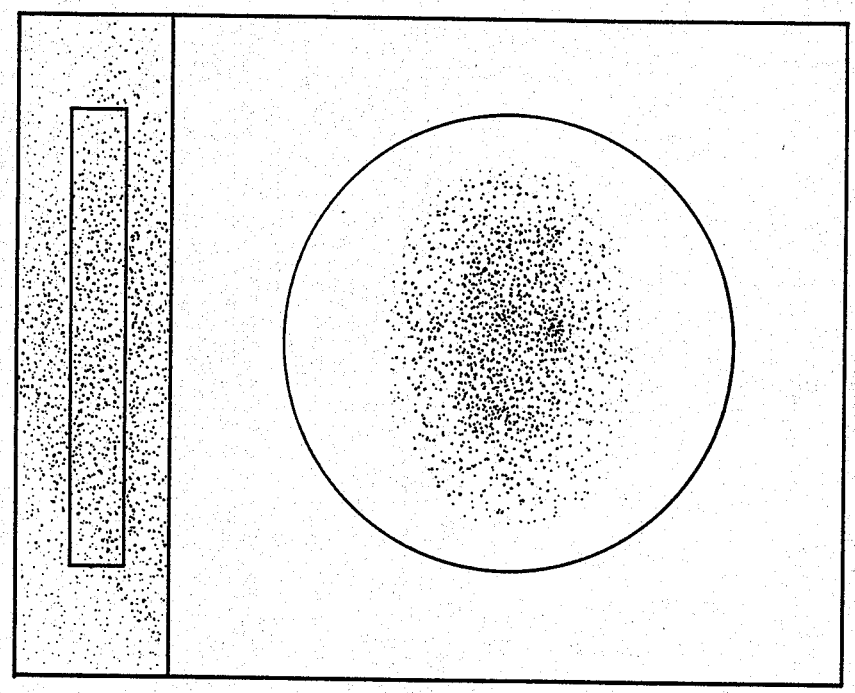
Figure 9:
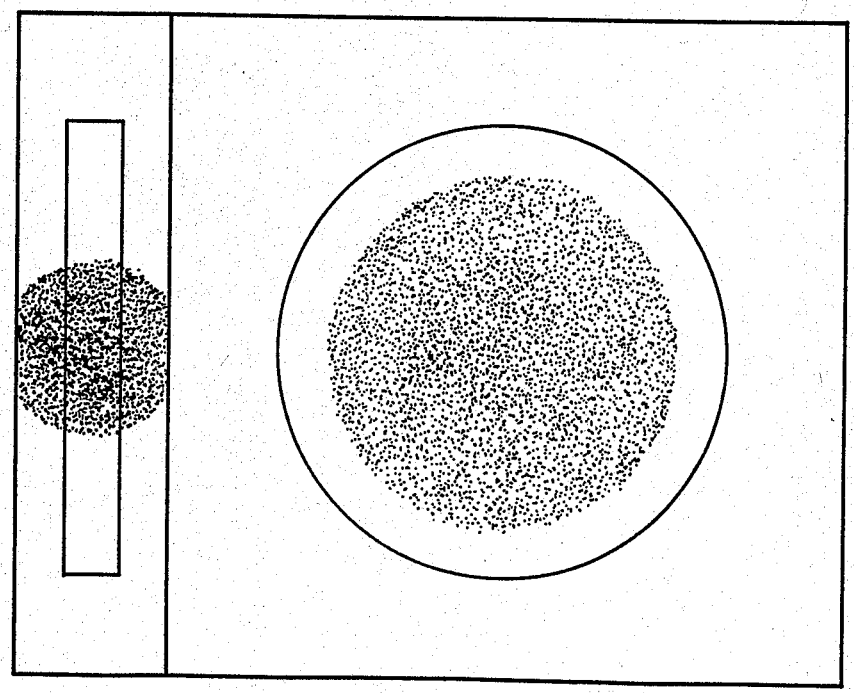

In FIGS. 4 and 5, the effect of the first aperture 24 on the light is illustrated for the case in which the light is collimated by the first lens 21. This same analysis is also applicable to cases in which the light is not collimated by the first lens. In each of FIGS. 4 and 5, four light rays are drawn to illustrate how the location of the first aperture 23 and its radius r affect the amount of light at each of the wavelengths that passes through both the first lens 21 and through aperture 23. The optical axis of the first lens is represented by line A. For each of the indicated wavelengths (190, 250, 600 and 800 nanometers), these four rays represent the most divergent ray at that wavelength, emanating from the center of source 25, that will pass through aperture 23. Thus, all light of wavelength 800 nanometers emanating from the center of source 25 at an angle from optical axis A less than $a_{800}$ will pass through aperture 23. This shows that the shorter the wavelength, the greater the amount of light that passes through both first lens 21 and aperture 23. Thus, aperture 23 serves to decrease the relative amount of light at the longer wavelengths that gets through the optical relay.

Because the distance $d_1$ from source 25 to lens 21 is selected to collimate the light at 250 nanometers, in FIGS. 4 and 5, the light at this wavelength is shown as being parallel to axis A in the region between lens 21 and lens 22. When aperture 23 is moved leftward as in FIG. 5, angle $a_{250}$ remains unchanged, but angle $a_{190}$ decreases and angles $a_{600}$ and $a_{800}$ increase In general, the amount of decrease of the short wavelengths relative to the long wavelengths decreases as aperture 23 is moved leftward. Therefore, the amount of decrease of the longer wavelengths can be varied by the choice of location of aperture 23. Indeed, if aperture 23 is placed at the same location as lens 21, then all wavelengths will be blocked equally by barrier 24 so that there will be no effect by barrier 24 on the shape of the spectral distribution of light passing through the optical relay. Additional apertures can be used to further shape the spectrum of FIG. 3.

The distances $d_2$, $d_3$ and $d_4$ are selected so that the light beam is focussed on slit 27. Again, because of chromatic aberration, only a single wavelength can be focussed on the slit. This wavelength is chosen in conjunction with the location of aperture 23 to make the spectrum as flat as possible. Various criteria for flatness can be used such as: (1) minimization of the peak to peak variation of the spectrum; (2) the least squares fit of the spectrum of FIG. 3 to a flat spectrum; or (3) a visual comparison of spectra resulting for various choices of parameters with the choice of parameters being those associated with the spectrum that visually appears to be the flattest. Any of these techniques will produce comparable results.

The wavelength that is imaged onto the slit will be denoted as $w_f$. Since the position of aperture 23 can be adjusted to enhance the short wavelength part of the spectrum, in general $w_f$ will be chosen closer to the long wavelength end of the range of interest than to the short wavelength end.

Figure 3:
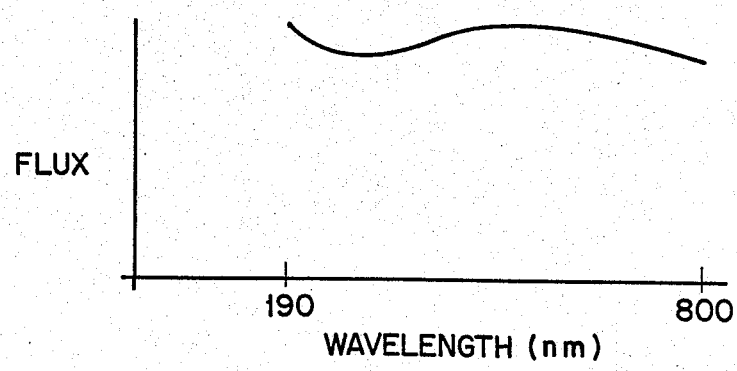
FIG. 3 shows the spectral distribution that results when the location of the first aperture and the wavelength of light focussed onto the slit are selected to achieve a substantially flat spectrum.

The radius r of aperture 23 can also be varied to vary the shape of the spectrum in FIG. 3. In general, r must be chosen to be small enough that at least some light rays that would otherwise pass through the optical relay are blocked by opaque barrier 24. If this were not the case, then aperture 23 would have no effect on the spectrum of FIG. 3. In FIGS. 4 and 5, r was chosen to serve as an optical stop for all wavelengths from 190 nanometers to 800 nanometers. In general, at least one of the apertures should have a radius sufficiently small that it serves as a stop for the optical relay. If this were not the case, then light incident on lens 21 or lens 22 at its outer perimeter would reach the detector through slit 27. However, lenses typically have irregularities or chips at their outer perimeter so that it is common to block such light from passing through an optical system. The stop also restricts the light reaching slit 27 to the more paraxial rays so that spherical aberration effects are reduced. But if a lens is polished at its outer perimeter, then the light incident at its outer perimeter could be allowed to pass through the optical relay. In such a case, that lens also functions as an aperture having a radius equal to the radius of the lens.

In the discussion of FIGS. 4 and 5, the qualitative effect of the aperture location on the spectral distribution of light through slit 27 was discussed only for light rays emanating from the center of light source 25. Since light source 25 is typically an extended light source, a complete analysis requires that the effect of rays emanating from other than the center of light source 25 be taken into account. In general, the proper location for aperture 23 can be determined either empirically, by mathematical modelling or by a combination of modelling and empirical adjustment.

FIGS. 6-9 show some representative results of a mathematical model for the optical relay. This model uses ray tracing in which light rays emanating from a large number of points of source 25 are traced through the optical relay. In general, the points from which the rays emanate should cover the source in a reasonably uniform manner and the initial directions of the rays should cover in a reasonably uniform manner the range of initial directions that pass through the optical relay. In the particular model for which some representative results are shown in FIGS. 6-9, the locations of the emanation points and the choices of initial ray directions are chosen randomly.

At the left in each of these figures is shown the calculated distribution of rays at slit 27. At the right in each of these figures is shown the calculated distribution of rays at a holographic grating located o the right of slit 27 in FIG. 2 and centered on axis A. In each of these figures, the rays are traced for a single choice of $w_f$ and for a single ray wavelength w. In FIGS. 6-9, the choices of $w_f$ and w are, respectively: (FIG. 6) $w_f = 600$ nm, w = 190 nm; (FIG. 7) $w_f = 400$ nm, w = 400 nm; (FIG. 8) $w_f = 400$ nm, w = 190 nm; and (FIG. 9) $w_f = 600$ nm, w = 800 nm. It is advantageous to make the light beam overfill slit 27 so that resolution is not wavelength dependent. It is also advantageous to fill a large fraction of the holographic grating so that a large fraction of the grating is utilized to disperse the light.

Investigation of results like those shown in FIGS. 6-9 enable the parameters to be chosen that result in the flattest spectral throughput of light through slit 27. An optimized relay was produced with the following values of parameters shown in FIG. 2. Source 25 emits light through a 1 millimeter diameter aperture. Lens 21 is a distance $d_1 = 35.33$ millimeters from source 25. Lens 21 is flat on the side facing source 25, has a $-18.78$ mm radius of curvature on the other side and is 2.50 mm thick in the middle. The front edge of the sample cell is 72.00 mm from the back side of lens 21. The sample cell has 1 mm thick walls and a cavity that is 10 mm wide in the direction of axis A. The front side of lens 22 has a curvature of 4.21 mm and is 72.00 mm from the back side of the sample cell. The back side of lens 22 is flat and lens 22 is 1.30 mm thick in the middle. Aperture 23 is located at the back edge of lens 22 and has a radius r = 1.1 mm. Slit 27 is 0.061 mm wide, is 0.500 mm high and is located 8.35 mm from aperture 23.

Figure 10:
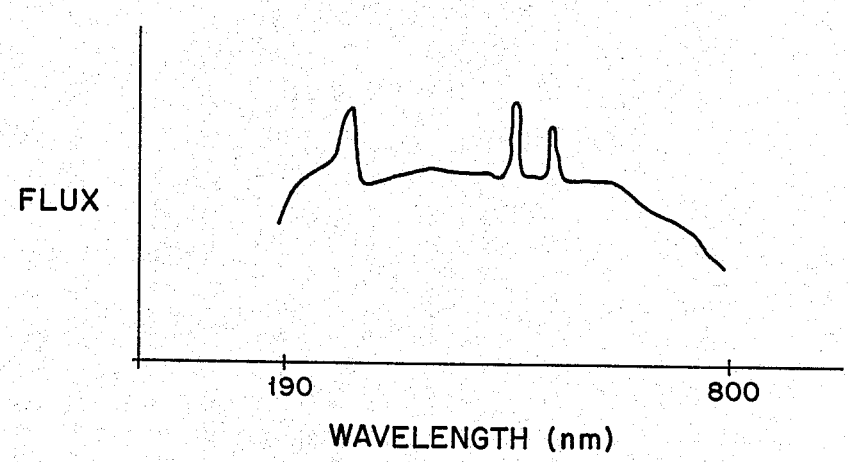
FIG. 10 qualitatively illustrates the non-flat spectral distribution of light emanating from a typical light source.
Figure 11:
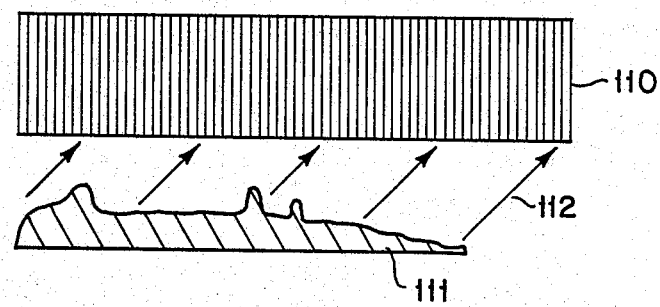
FIG. 11 illustrates one simple method of correcting for the non-flat spectral distribution of light emanating from a typical light source.

The spectrum in FIG. 3 was produced assuming that the spectral flux distribution from light source 25 is flat across the sprectral range of interest. In general, this is not the case. The qualitative shape of a typical spectral flux distribution is shown in FIG. 10. Source 25 is typically chosen to be intense within the range of interest so that it is common for the flux to roll of near each end of the spectral range of interest. In addition, the flux exhibits peaks at various points in the range of interest. One simple scheme to compensate for such variations is illustrated in FIG. 11. A photodiode array 110 is used to measure the spectral intensity in light dispersed by the holographic grating. In order to compensate for the flux distribution of FIG. 10, an opaque mask 111 is placed in front of the photodiode array to intercept at each photodiode a sufficient fraction of the light rays 112 to compensate for the non-flat distribution of FIG. 10.

Such a mask can also be used to compensate for some or all of the chromatic aberration of the optical relay. Often, a mask has already been designed to correct for the source flux spectral variation, so that the parameters of the optical relay are chosen assuming a flat flux spectrum from the light source. In other cases, the optical relay parameters are chosen in cooperation with the shape of mask 111. In one particular embodiment, aperture 23 can be located at lens 21 (so that it provides no enhancement of the short wavelength rays relative to the long wavelength rays and serves only as a stop) and all of the chromatic aberration corrections for source 25 and for the optical relay can be achieved by the shape of mask 111.

We claim:

1. An optical apparatus for focussing light from a light source onto a slit, said optical relay comprising:
   a first simple lens;
   a second simple lens through which light from the light source passes, after passing through the first lens; and
   a first opaque barrier defining a first aperture through which light from the light source passes after passing through the first lens, the distance of the first opaque barrier from the first lens being selected to produce through the slit a flux of light that is substantially flat as a function of wavelength over a range of wavelengths of interest.

2. An optical apparatus as in claim 1 further comprising:
   at least one additional opaque barrier defining an aperture, the location of this additional opaque barrier being selected in conjunction with the choice of location of the first opaque barrier to produce through the slit a flux of light that is substantially flat as a function of wavelength over a range of wavelengths of interest.

3. An optical apparatus as in claim 1 further comprising:
   a light source;
   an opaque barrier defining a slit;
   said first lens being located relative to the light source such that light at a reference wavelength $w_r$ within the range of wavelengths of interest is collimated after the light passes through the first lens.

4. An optical apparatus as in claim 3 further comprising:
   a dispersive element on which the light is incident after passing through the slit;
   a plurality of detectors for detecting the flux of light through the slit at a plurality of wavelengths; and
   a mask located between the dispersive element and the detectors
   said mask having a shape such that it corrects for deviations from a flat spectral distribution of light flux from the light source as a function of wavelength.

5. An optical apparatus as in claim 4 wherein said mask further corrects for deviations from a flat spectral distribution of light flux through the slit resulting from chromatic aberrations of the first and second simple lenses.

6. An optical apparatus as in claim 1 further comprising:
   a light source;
   an opaque barrier defining a slit;
   said first lens being located relative to the light source such that light at a reference wavelength $w_r$ within the range of wavelengths of interest is focussed at a point of focus located between the first and second lenses.

7. An optical apparatus as in claim 6 further comprising:
   a dispersive element on which the light is incident after passing through the slit;
   a plurality of detectors for detecting the flux of light through the slit at a plurality of wavelengths; and
   a mask located between the dispersive element and the detectors
   said mask having a shape such that it corrects for deviations from a flat spectral distribution of light flux from the light source as a function of wavelength.

8. An optical apparatus as in claim 7 wherein said mask further corrects for deviations from a flat spectral distribution of light flux through the slit resulting from chromatic aberrations of the first and second simple lenses.

9. An optical apparatus as in claim 1 wherein said first aperture has a linear dimension D that is selected to optimize the flatness of the flux of light as a function of wavelength over said range of interest.

10. An optical apparatus as in claim 3 wherein said range of interest extends from a wavelength $w_1$ to a wavelength $w_2$ and wherein the reference wavelength $w_r$ is selected to obey substantially the relation:

$$n(w_r) = [n(w_1) + n(w_2)]/2$$

where $n(w)$ is the index of refraction of said first lens as a function of the wavelength $w$ of light through it.

11. An optical apparatus as in claim 3 wherein the distances from the source of the first lens, the second lens and the opaque barrier defining the slit are selected to focus light of a wavelength $w_f$ from said source onto said barrier defining the slit, and
   wherein $w_f$ is selected in conjunction with the distance of the first opaque barrier from the source to optimize the flatness of the flux of light as a function of wavelength over the range of wavelengths of interest.

* * * * *

UNITED STATES PATENT AND TRADEMARK OFFICE
CERTIFICATE OF CORRECTION

PATENT NO. : 4,784,487
DATED : November 15, 1988
INVENTOR(S) : George W. Hopkins, II; Barry G. Willis It is certified that error appears in the above-identified patent and that said Letters Patent is hereby corrected as shown below:

Column 1, Line 34, "AND" should read -- NAD --;

Column 1, Line 52, "lenses" should read -- lenses. --;

Column 5, Line 15, "Fiqures" should read -- "Figures --;

Column 7, Line 7, "increase" should read -- "increase. --;

Column 8, Line 21, "o" should read -- to --;

Column 8, Line 25, "wf 32 600" should read -- wf = 600 --;

Signed and Sealed this

Second Day of January, 1990

*Attest:*

JEFFREY M. SAMUELS

*Attesting Officer*     *Acting Commissioner of Patents and Trademarks*